United States Patent [19]

Taig et al.

[11] Patent Number: 4,793,447
[45] Date of Patent: Dec. 27, 1988

[54] ELECTRICALLY OPERATED DISC BRAKE

[75] Inventors: Alistair G. Taig, South Bend; Paul J. Grabill, Mishawaka; Robert W. Jackson, South Bend, all of Ind.

[73] Assignee: Allied-Signal Inc., Morristown, N.J.

[21] Appl. No.: 946,400

[22] Filed: Dec. 23, 1986

[51] Int. Cl.[4] ............................................. F16D 55/16
[52] U.S. Cl. .................................... 188/72.1; 74/805; 188/72.8
[58] Field of Search .................... 188/72.1, 72.7, 72.8, 188/156, 157; 74/805, 785, 394

[56] References Cited

U.S. PATENT DOCUMENTS

| 1,968,585 | 7/1934 | Apple | 188/155 |
|---|---|---|---|
| 3,052,138 | 9/1962 | Louton, Jr. et al. | 74/805 |
| 3,474,922 | 10/1969 | Wood et al. | 214/85.5 |
| 3,478,848 | 11/1969 | Seip | 188/152 |
| 3,866,721 | 2/1969 | Pringle | 188/72.6 |
| 4,010,653 | 3/1977 | Mekjian | 74/805 |
| 4,159,754 | 7/1979 | Airheart et al. | 188/71.8 |
| 4,355,708 | 10/1982 | Papagni | 188/196 D |
| 4,386,540 | 6/1983 | Skaggs, Jr. | 74/805 |
| 4,406,352 | 4/1983 | Scott et al. | 188/72.8 |
| 4,487,295 | 12/1983 | Mitchell | 188/72.6 |
| 4,546,296 | 10/1985 | Washbourn et al. | 318/372 |
| 4,596,316 | 6/1986 | Crossman | 188/72.1 |
| 4,658,939 | 4/1987 | Kircher et al. | 188/72.8 X |

FOREIGN PATENT DOCUMENTS

| 0129969 | 1/1985 | European Pat. Off. . |
|---|---|---|
| 2219336 | 9/1974 | France . |
| 56-31532 | 3/1981 | Japan . |
| WO82/00172 | 2/1982 | U.S.S.R. . |
| 2156021 | 10/1985 | United Kingdom . |

Primary Examiner—Andres Kashnikow
Assistant Examiner—Matthew C. Graham
Attorney, Agent, or Firm—Larry J. Palguta; Ken C. Decker

[57] ABSTRACT

The electrically operated disc brake (10, 110, 310, 410) may be operated by either hydraulic pressure and an electric motor or operated solely by means of an electric motor. The electric motor (40, 340, 440) drives a sun gear (52, 352, 452) of a planetary gear assembly (50, 150, 350, 450). The planetary gear assembly (50, 150, 350, 450). includes a fixed ring gear (70, 370, 470) and a rotatable ring gear (80, 180, 380, 480), the rotatable ring gear (80, 180, 380, 480) having fewer teeth than the fixed ring gear (70, 370, 470) so that rotation of the planetary gears (54, 56, 58) effects a slower rate of rotation of the rotatable ring gear (80, 180, 380, 480). The rotatable ring gear (80, 180, 380, 480) engages a screw (88, 188, 388, 488) which is connected with the piston (30, 130, 330, 430). The piston (30, 330, 430) may be displaced by hydraulic fluid for a service application and the electric motor (40, 340, 440) utilized for a parking application. Alternatively, the piston (130) may be displaced by the electric motor (40) for both service and parking brake applications.

23 Claims, 9 Drawing Sheets

ELECTRICALLY OPERATED DISC BRAKE

This invention relates generally to a disc brake that may be operated both hydraulically and electrically, or solely by motor means.

Disc brakes have been utilized for many years in passenger cars, heavy duty trucks, and aircraft. Because of the increasing emphasis on reducing the weight of vehicles and simplifying the components thereof, it is desirable to develop a braking system that is operated electrically. Such a braking system must be highly reliable, cost effective, and practical within the packaging constraints of the particular vehicle. The present invention provides a disc brake that my be operated either solely by means of an electrically or hydraulically operated motor or be operated hydraulically for a service brake application and operated by the motor for a parking brake application. The result is a highly reliable, low cost, electrically operated disc brake which will fit readily within the packaging constraints of several vehicles.

The present invention comprises a disc brake that may be operated by motor means, comprising a caliper having a bore with a piston slidably received therein, the caliper and piston actuable to displace a pair of friction elements into engagement with a rotor, a planetary gear assembly disposed within said bore and comprising a sun gear, planetary gears, and a pair of ring gears, and the motor means coupled with said sun gear which drives the planetary gears, one ring gear fixed to said caliper and the other ring gear rotatable by said planetary gears, the other ring gear engaging screw means which is connected with said piston, operation of said motor means causing rotation of said other ring gear and operative displacement of said piston into engagement with one of said friction elements so that the caliper, by reaction, displaces the other friction element into engagement with said rotor.

The invention is described in detail below with reference to the drawings which illustrate embodiments in which.

Figure 1:
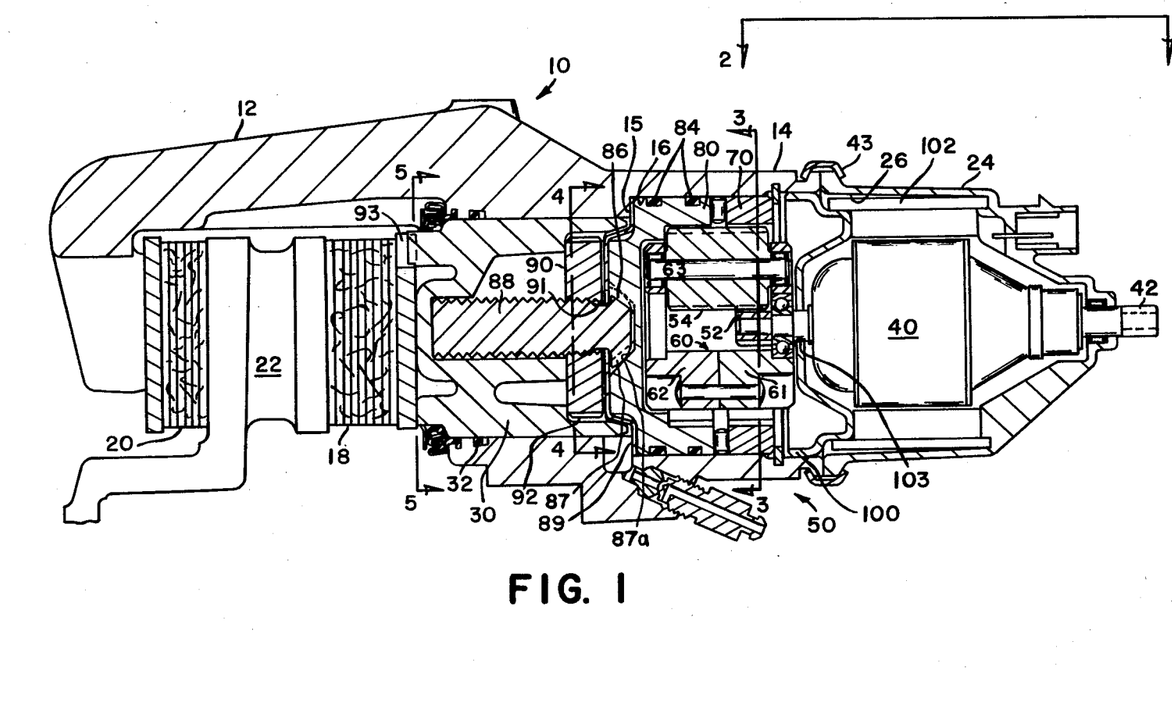
FIG. 1 is a section view of the first embodiment.
Figure 2:
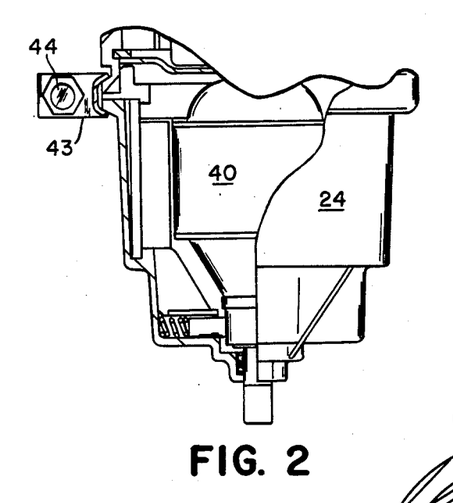
FIG. 2 is a partial section view along view line 2—2 of FIG. 1.
Figure 3:
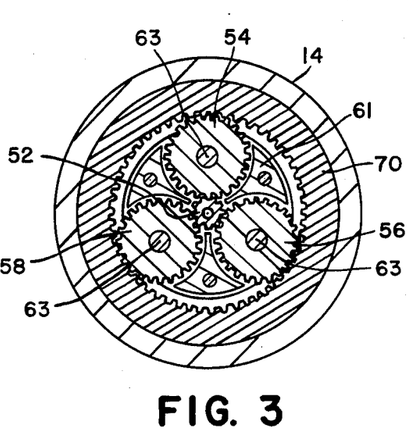
FIG. 3 is a section view along view line 3—3 of FIG. 1.
Figure 4:
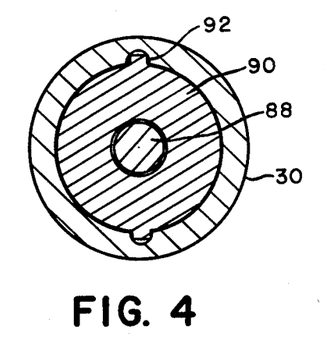
FIG. 4 is a section view along view line 4—4 of FIG. 1.
Figure 5:
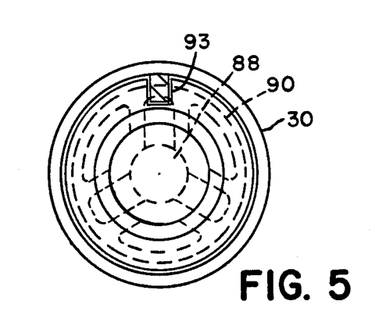
FIG. 5 is a section view along view ling 5—5 of FIG. 1.

The disc brake of the present invention is referenced generally by numeral 10 in FIG. 1. Disc brake 10 comprises a brake that is operated by either hydraulic pressure or an electric motor. Disc brake 10 includes a caliper 12 having a caliper housing 14 with a bore 16. Caliper 12 extends over a pair of friction elements 18 and 20 which may be displaced toward one another in order to brake a rotor 22. The bore 16 comprises a stepped bore having a piston 30 slidably disposed therein, the piston having a seal 32 located thereabout in order to prevent hydraulic fluid from exiting bore 16. Caliper housing 14 is connected with an electric motor housing 24 which has a bore 26 housing an electric motor 40. Motor 40 may comprise other types of motors, such as an hydraulic motor. Housing 24 is coupled to caliper housing 14 by means of a clamp band 43, the clamp band 43 held together by a nut and bolt connection 44 (see FIG. 2). A planetary gear assembly 50 is disposed within bore 16, the planetary gear assembly 50 comprising a sun gear 52, three planetary gears 54, 56, and 58 (see FIG. 3), a two-part carrier 60 comprising carrier parts 61 and 62, pins 63 which carry the planetary gears, and two ring gears 70 and 80. Each ring gear has internal teeth, and ring gear 80 is rotatable but has fewer teeth than ring gear 70 which is fixed to caliper housing 14. Rotatable ring gear 80 includes thereabout a pair of seals 84, the seals preventing hydraulic fluid from entering into the planetary gear assembly. Rotatable ring gear 80 is coupled nonrotatably through a tapered spline connection 86 with screw means 88. The screw means 88 has a spherical end surface 87a on each spline 87 that engages the tapered spline connection 86 in order to enable the screw means to axially misalign with rotatable ring gear 80 while preventing circumferential rotation between screw means 88 and gear 80. The axial misalignment allows the screw means 88, and nut 90 disposed thereabout, to line up with piston 30 that is aligned according to caliper deflection, and thus improve the efficiency of the screw and nut mechanism. Screw means 88 has external threads engaging the threads of nut 90, and is supported in opening 31 of piston 30 (see FIGS. 1 and 5). Nut 90 is coupled nonrotatably through a key connection 92 (see FIG. 4) with piston 30. Piston 30 is coupled nonrotatably by means of connection 93 with friction element 18. Disposed about screw means 88 is a screw-retaining plate 89 which is held in axial position between housing shoulder 15 and rotatable ring gear 80, the retaining plate 89 having a central opening 91 for screw means 88. Fixedly positioned retaining plate 89 prevents screw means 88 from moving axially within bore 16. Located at the other end of bore 16 is motor plate 100 that encloses the end of bore 16 and also engages the steel ring 102 of motor 40. Plate 100 has an opening 103 which effects alignment of the drive shaft of motor 40, and the plate also extends within steel ring 102 in order to position the motor. Steel plate 100 keeps gearbox oil from entering into bore 26 and motor 40.

The planetary gear assembly has a high reduction ratio which is achieved by having fewer internal teeth on rotatable ring gear 80 than on fixed ring gear 70. Sun gear 52 causes planet carrier 60 to rotate in the same direction as the sun gear, but at a reduced speed due to the fixed ring gear 70. The two ring gears 70 and 80 have different numbers of teeth, the difference being equal to the number of planetary gears, (normally two or three). Thus, as planet carrier 60 rotates, the planetary gear teeth engage with the adjacent teeth of the two ring gears 70 and 80, and for each rotation of the planet carrier 60, rotatable ring gear 80 advances by three teeth (for a design with three planetary gears) or two teeth (for a design with two planetary gears). Hence, the overall ratio of the gear train is the ratio of speed of the sun gear to the planet carrier multiplied by the number of teeth of the output rotatable ring gear divided by the number of planetary gears. A typical system might have 18 teeth on the sun; 72 teeth on the fixed ring; 69 teeth on the output rotatable ring, and three planetary gears. The overall ratio would be:

$$(72/18+1) \times (69/3) = 115/1$$

The difference in tooth numbers is achieved by modifying the operating pressure angles of the internal teeth so that the gear with fewer teeth (preferably the rotatable ring gear 80) engages at a high pressure angle than that with more teeth. The high pressure angle teeth can be generated with a standard 20° involute cutter working on an enlarged internal gear blank at the appropriate ratio.

The screw means 88 can have a friction reducing surface treatment in order to improve drive efficiency. However, for parking brake use it is essential to choose a drive screw which is irreversible so that the brake remains applied after the motor current is turned off. A reverse motor torque is used to release the brake.

A motor control circuit which controls motor torque (or current) is used. In a parking brake application, a hand lever with force feedback can be used to control a variable sensor such as a rheostat or force transducer which signals the controller to provide the appropriate motor current. Alternatively, a parking switch can activate the brake and an inclination sensor can provide a motor current level more than adequate for the grade, with a fully laden vehicle. With either system (and unlike a spring brake), the motor is controlled to provide enough torque to park the vehicle, without using unnecessarily high torques which load the mechanism excessively. Also, because current is proportional to torque, when the brake is applied for a parking brake application a datum point may be set when a predetermined force level is reached, and this datum point would be utilized by the controller during the release of the brake. Brake release would be accomplished by reversing the motor, but in order to maintain proper brake adjustment, the motor should be stopped when a small brake pad clearance is reached. To do this, the motor controller senses a predetermined low level current at the datum, during backoff, then continues turning the motor for a desired number of motor turns, which creates the necessary pad clearance.

Drive shaft flat 42 (see FIGS. 1 and 6) permits the attachment of a hand crank so that the brake can be applied or released manually.

Figure 6:
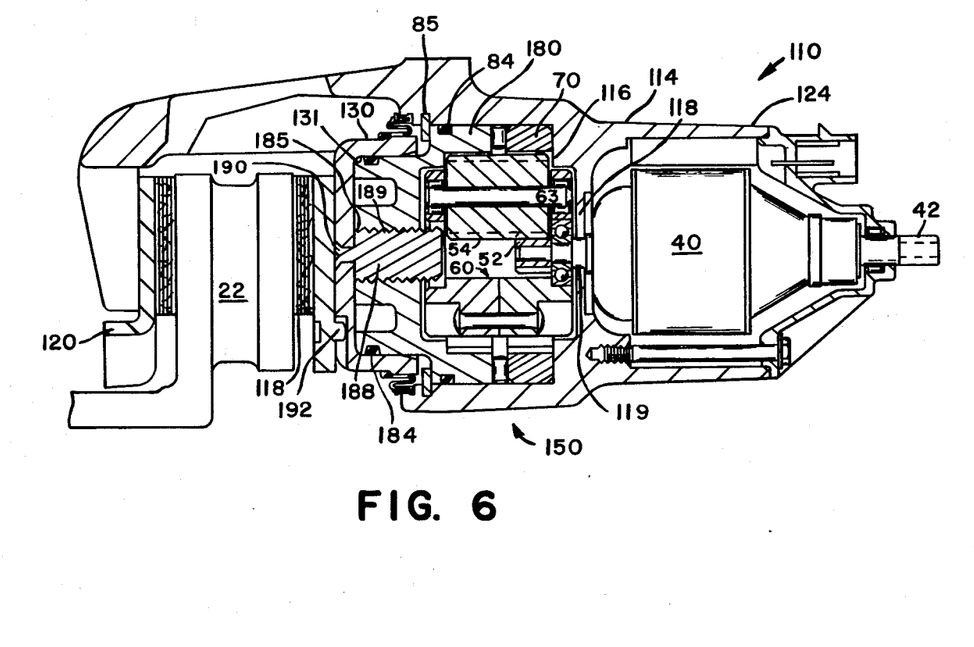
FIG. 6 is a section view of a second embodiment of an electrically operated disc brake.
Figure 7:
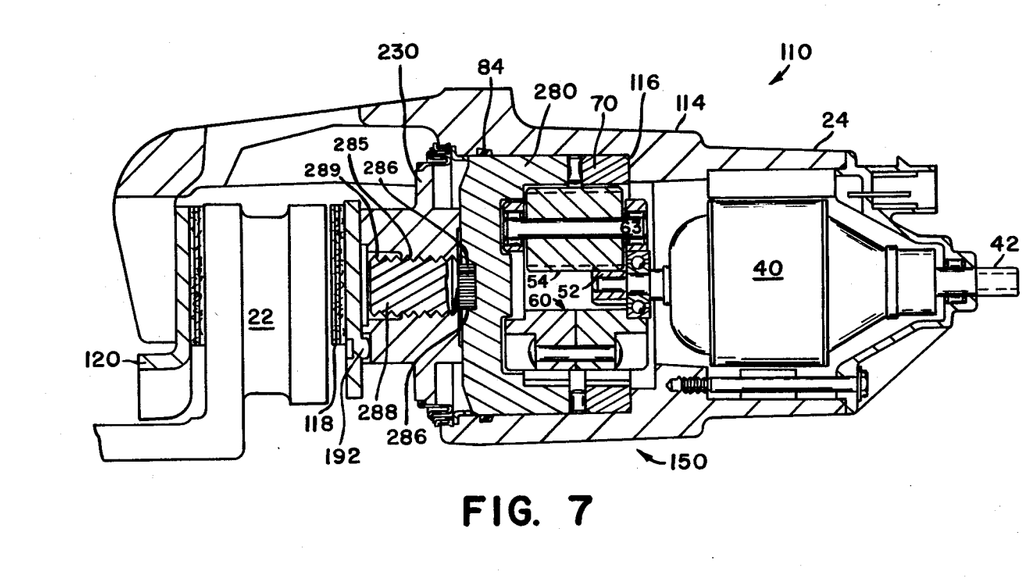
FIG. 7 is an alternative embodiment of the brake of FIG. 6.

Turning now to FIG. 6, there is illustrated an electrically operated disc brake 110 which utilizes an electric motor for both service and parking brake applications. Similar structure will be indicated by the same numerals utilized above. The caliper housing 114 includes a stepped bore 116, the stepped bore having a radially extending wall 118 which extends to an opening 119 that provides journalling for the output shaft of the electric motor 40. The planetary gear system 150 includes a fixed ring gear 70 and a rotatable ring gear 180. The rotatable ring gear 180 has fewer teeth than the fixed ring gear 70. Rotatable ring gear 180 includes a seal 84 disposed thereabout and gear 180 engages a ring 85 extending radially inwardly of stepped bore 116. Piston 130 is disposed at the entrance of stepped bore 116 and is positioned on rotatable ring gear 180. Another seal 184 is disposed about rotatable ring gear 180 and engages the interior surface of opening 131 of piston 130. Rotatable ring gear 180 engages screw means 188 by means of internal ring gear threads 185 and screw means threads 189. Screw means 188 is fixed nonrotatably through a key connection 190 with piston 130. Piston 130 is fixed nonrotatably by a key connection 192 with the inner friction element 118. In this embodiment of the invention, the rotatable ring gear 180 engages directly screw means 188 which is fixed nonrotatably with the piston that is fixed to the nonrotatable friction element 118. Thus, as rotatable ring gear 180 rotates, screw means 188 is displaced axially to engage friction element 118 with rotor 22, and by reaction, friction element 120 with the other side of rotor 22. The caliper housing 114 has an extension 124 which houses the electric motor 40. Because rotatable ring 180 engages directly screw means 188 which is fixed nonrotatably to piston 130, that portion of the structure is substantially shortened axially in relation to the previous embodiment. This enables electric motor 40 to be housed directly within extension 124 of caliper housing 114, the overall length of electric brake 110 being shortened. Electrically operated disc brake 110 has a planetary gear system which operates identically to that described above, but does not utilize any hydraulic pressure to actuate piston 130. Piston 130 is actuated both for service brake and parking brake applications by electric motor 40. In all other respects, electric disc brake 110 operates as described above for the first embodiment. FIG. 7 illustrates an alternative pistonscrew means-rotatable ring gear structure. Screw means 288 is connected nonrotatably by spline connection 286 with rotatable ring gear 280, and screw means threads 289 engage piston threads 285 of piston 230.

Figure 8:
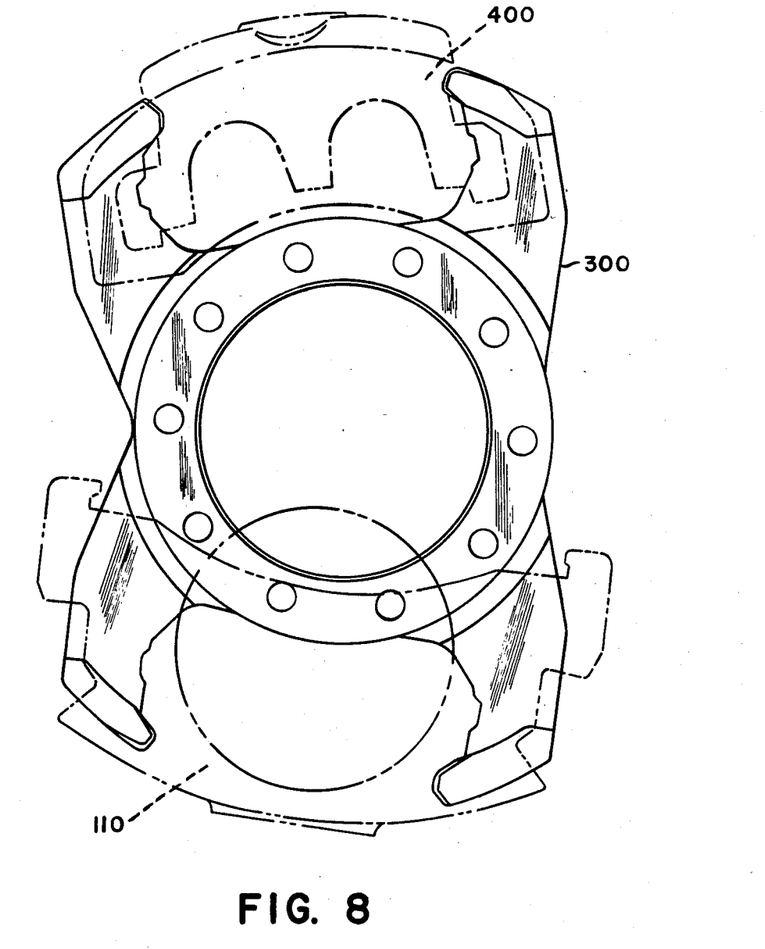
FIG. 8 is an end view of a duplex support plate and disc brake.

The disc brake of FIG. 6 may be utilized for a parking brake application and a separate hydraulic disc brake utilized for service brake applications. FIG. 8 illustrates a duplex support plate 300 which supports both the electric disc brake 110 and a separate hydraulically operated disc brake 400 (both shown in dotted line outlines).

Figure 9:
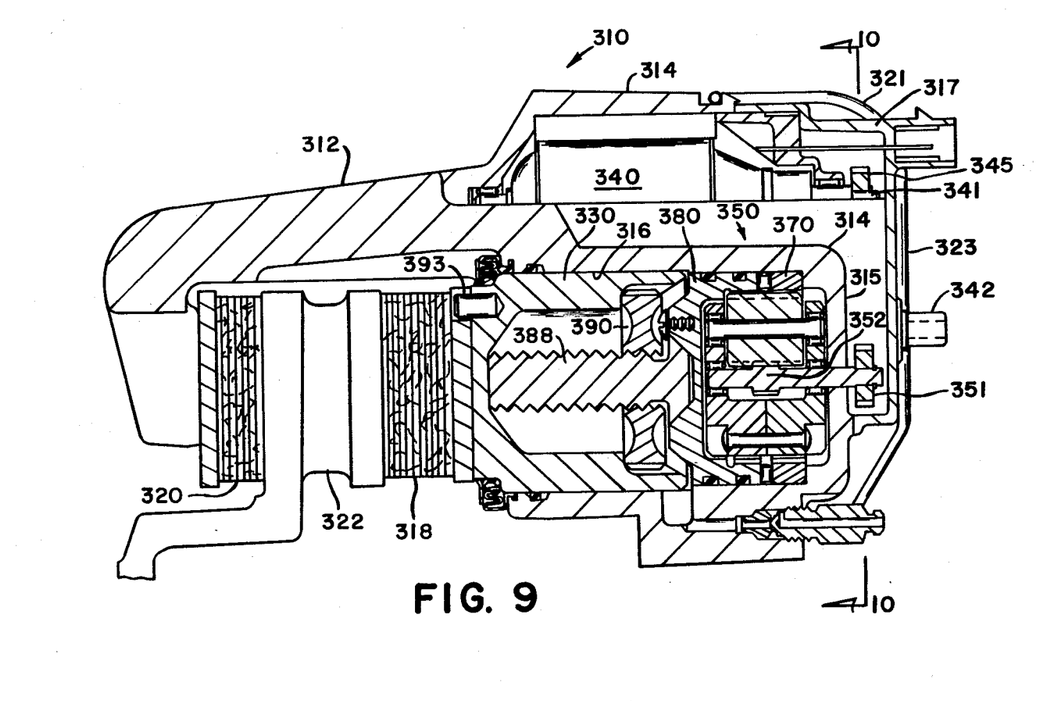
FIG. 9 is a section view of a twin bore disc brake.
Figure 10:
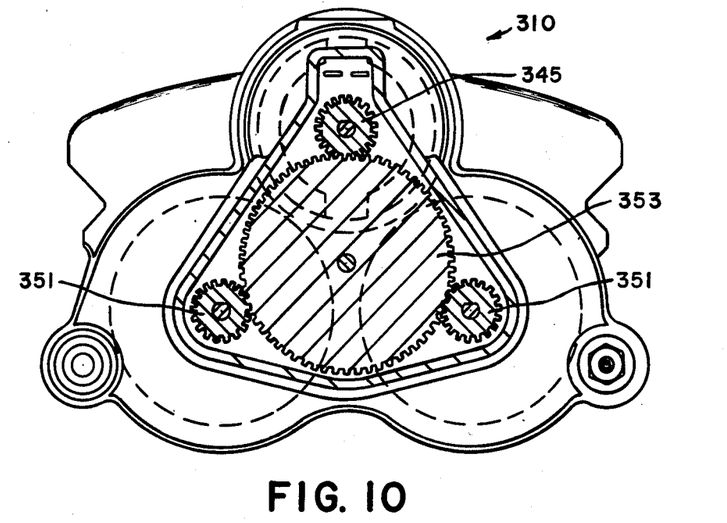
FIG. 10 is a section view taken along view line 10—10 of FIG. 9.
Figure 11:
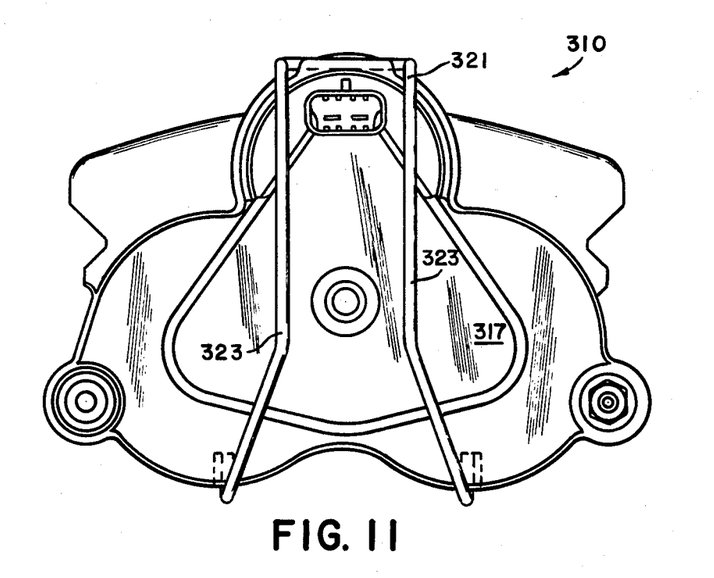
FIG. 11 is an end view of the brake of FIG. 9.

FIG. 9 illustrates a twin bore disc brake 310 having a pair of disc brake mechanisms disposed within twin bores and actuated by an electric motor disposed adjacent or parallel to the bores of the actuators. Twin bore disc brake 310 includes a caliper 312 which engages outer friction element 320, caliper housing 314 having bores 316 receiving therein pistons 330. Each piston 330 is displaced either by pressurized hydraulic brake fluid or by the electric motor 340 via the planetary gear assembly 350. Each piston 330 engages the inner brake pad 318 disposed adjacent rotor 322, piston 330 receiving nonrotatably by means of a key connection the nut 390 engaging the screw means 388. Piston 330 engages nonrotatably by means of key connection 393 the friction element 318. Each planetary gear assembly 350 is identical to those described above, in that it includes a non-rotatable ring gear 370 disposed coaxially with the rotatable ring gear 380, the gear assembly 350 including a sun gear 352 which drives three planatary gears. Sun gear 352 is connected with gear 351 that is engaged by idler 353 (see FIG. 10). The electric motor 340 is disposed parallel to the axis of bore 316, and includes a drive shaft 341 with drive gear 345 that powers idler 353. Idler 353 drives the two gears 351 each of which is connected via a shaft with an associated sun gear. FIG. 10 illustrates an end section view of the disc brake 310, and each bore of the twin bore disc brake includes a planetary gear assembly 350 and other structure identical to that shown in FIG. 9. Disc brake 310 includes an outer end plastic housing cover 317 which is held in place by clamp bracket 321 (see FIG. 11). Clamp bracket 321 includes legs 323 which hold housing cover 317 in place. As shown by FIG. 9, caliper housing 314 includes end portion 315 which is integral with the remaining portions of caliper housing 314 so that the planetary gear assemblies 350 and pistons 330 are both enclosed within the bores 316. The outer diameter of the planetary gear assemblies 350 located within the twin bores of disc brake 310 are essentially the same as the outer piston diameters. Thus, the gear assemblies 350 are small enough to be housed within bores 316 and provide the required actuation loads while permitting the utilization of an integral caliper housing which is disposed about the ends of gear assemblies 350 in order to receive the reaction loading or forces effected by assemblies 350 when they operate and displace pistons 330 outwardly against rotor 322.

Figure 12:
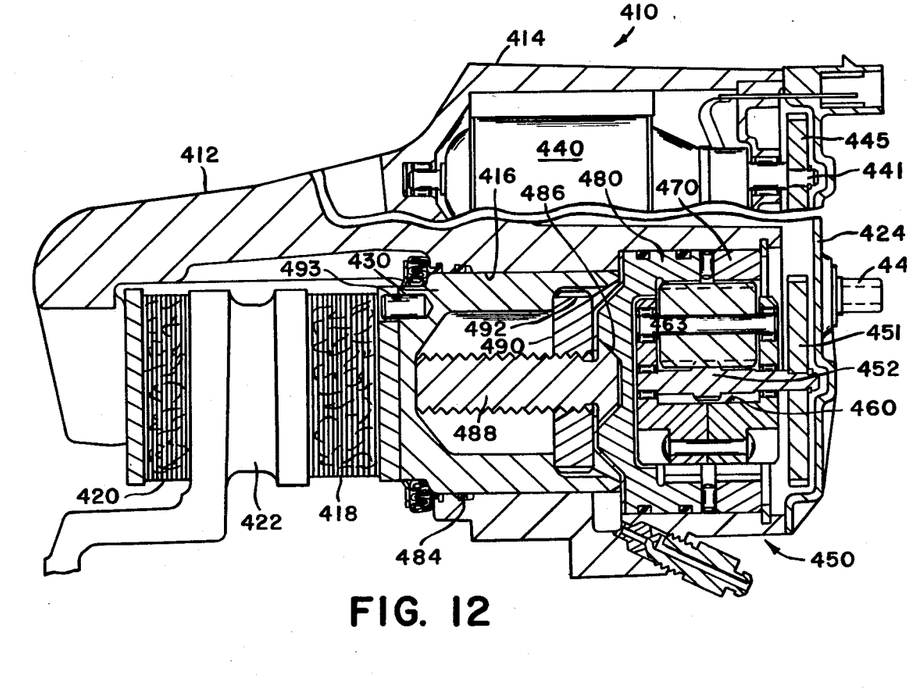
FIG. 12 is a section view of a twin bore disc brake.
Figure 13:
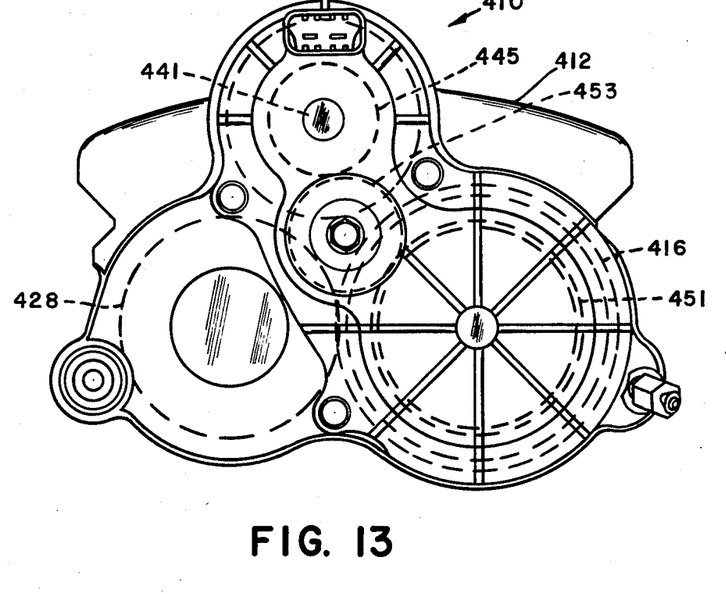
FIG. 13 is an end view of the brake of FIG. 12.

FIGS. 12 and 13 represent an embodiment which comprises a twin bore disc brake 410 having one piston actuated solely by means of hydraulic fluid pressure and the other piston actuated by either hydraulic fluid pressure or by means of a planetary gear assembly 450 actuated by an electric motor 440 disposed parallel to the twin bores. Structure similar to that described above is identified by the same numeral increased by 100. Disc brake 410 comprises a right side bore 416 housing the piston 430, screw means 488, nut 490, and planetary gear assembly 450. The left side bore 428 (see FIG. 13) includes a typical disc brake piston (not shown) which is actuated or displaced soley by pressurized brake fluid. The electric motor 440 is disposed upon an axis located parallel to the longitudinal axis of disc brake 410, and includes a motor shaft 441 connected to a drive gear 445 which drives the idler 453 that engages gear 451 connected with sun gear 452. As a result, the left side bore 428 (see FIG. 13) containing the hydraulically actuated piston may be utilized for service brake applications, while the right side bore 416 containing the planetary gear assembly 450 may be actuated by electric motor 440 via idler 453 for parking brake applications and actuated hydraulically for service brake applications.

The various embodiments of the disc brake having the planetary gear assembly may be utilized for drive line braking of a vehicle. The "rotor" to be braked may be attached to the vehicle's propulsion shaft or driven by it, and the caliper mounted on the transmission or rear axle assembly. All of the above-described motors may be electric motors, hydraulic motors, and any other appropriate driving source.

Other provisions of the invention or variations will become apparent to those skilled in the art and will suggest themselves from the specific applications of the invention. It is intended that such variations and revisions of the invention as reasonably to be expected on the part of those skilled in the art, to suit individual design preference and which incorporate the herein disclosed principles, will be included within the scope of the following claims as equivalents thereof.

We claim:

1. A disc brake that may be operated by motor means, comprising a caliper having a bore with a piston slidably received therein, the caliper and piston actuatable to displace a pair of friction elements into engagement with a rotor, a planetary gear assembly disposed within said bore and comprising a sun gear, planetary gears, and a pair of ring gears, and the motor means coupled with said sun gear which drives the planetary gears, one ring gear fixed to said caliper and the other ring gear rotatable by said planetary gears, the other ring gear engaging screw means which is connected with said piston, the other ring gear coupled nonrotatably with screw means in order to effect rotation of the screw means while permitting axial misalignment therebetween, operation of said motor means causing rotation of said other ring gear and operative displacement of said piston into engagement with one of said friction elements so that the caliper, by reaction, displaces the other friction element into engagement with said rotor.

2. The disc brake in accordance with claim 1, wherein the screw means has splines disposed at an end thereof, the splines having spherical-shaped end surfaces which are received at tapered spline surfaces on the other ring gear in order to effect the non-rotatable connection which permits the axial misalignment.

3. The disc brake in accordance with claim 2, wherein the motor means comprises an electric motor.

4. The disc brake in accordance with claim 3, wherein the piston includes sealing means disposed thereabout and the other ring gear includes a pair of seals disposed thereabout, the sealing means and pair of seals effective to retain fluid within a portion of the bore disposed axially between said pair of seals and sealing means so that said piston may be operated by hydraulic pressure.

5. The disc brake in accordance with claim 1, wherein said piston is connected with said screw means by means of a nut having internal threads engaging threads of the screw means.

6. The disc brake in accordance with claim 5, wherein the nut and piston are coupled together by a key connection which prevents relative rotation therebetween.

7. The disc brake in accordance with claim 1, further comprising a screw retaining plate disposed about said screw means, the screw retaining plate preventing axial displacement of said screw means.

8. The disc brake in accordance with claim 1, wherein the caliper further comprises a motor housing attached to said caliper as an extension thereof, the motor means disposed within said motor housing.

9. The disc brake in accordance with claim 1, wherein the other ring gear has fewer teeth than the fixed ring gear so that other ring gear rotates at a slower rate than said planetary gears rotate.

10. The disc brake in accordance with claim 1, wherein said piston and one friction element include key means for effecting a non-rotatable connection therebetween.

11. The disc brake in accordance with claim 1, wherein the planetary gear assembly comprises carrier means for the planetary gears, the carrier means comprising first and second parts held together by securement means.

12. A disc brake that may be operated by motor means, comprising a caliper having a bore with a piston slidably received therein, the caliper and piston actuatable to displace a pair of friction elements into engagement with a rotor, a planetary gear assembly disposed within said bore and comprising a sun gear, planetary gears, and a pair of ring gears, and the motor means coupled with said sun gear which drives the planetary gears, one ring gear fixed to said caliper and the other ring gear rotatable by said planetary gears, the other ring gear engaging screw means which is connected with said piston, a motor housing attached to said caliper as an extension thereof, the motor means disposed within said motor housing, and a motor plate disposed within said motor housing and effecting alignment of said motor means, operation of said motor means causing rotation of said other ring gear and operative displacement of said piston into engagement with one of said friction elements so that the caliper, by reaction, displaces the other friction element into engagement with said rotor.

13. The disc brake in accordance with claim 12, wherein the motor plate engages both the bore and the motor means in order to effect positioning of the motor means, and extends within the motor housing in order to keep contaminants from entering said planetary gear assembly.

14. The disc brake in accordance with claim 13, wherein the motor housing is attached to said caliper by clamping means.

15. A disc brake that may be operated by motor means, comprising a caliper having a bore with a piston slidably received therein, the caliper and piston actuatable to displace a pair of friction elements into engagement with a rotor, a planetary gear assembly disposed within said bore and comprising a sun gear, planetary gears, and a pair of ring gears, and the motor means coupled with said sun gear which drives the planetary gears, one ring gear fixed to said caliper and the other ring gear rotatable by said planetary gears, the other ring gear engaging screw means which is connected with said piston, the bore including ring means disposed therein and projecting radially inwardly of said bore, the ring means providing an axial stop for said other ring gear, operation of said motor means causing rotation of said other ring gear and operative displacement of said piston into engagement with one of said friction elements so that the caliper, by reaction, displaces the other friction element into engagement with said rotor.

16. A disc brake that may be operated by motor means, comprising a caliper having a bore with a piston slidably received therein, the caliper and piston actuatable to displace a pair of friction elements into engagement with a rotor, a planetary gear assembly disposed within said bore and comprising a sun gear, planetary gears, and a pair of ring gears, and the motor means coupled with said sun gear which drives the planetary gears, one ring gear fixed to said caliper and the other ring gear rotatable by said planetary gears, the other ring gear engaging screw means which is connected with said piston, the other ring gear including an opening with internal threads which engage threads of the screw means, operation of said motor means causing rotation of said other ring gear and operative displacement of said piston into engagement with one of said friction elements so that the caliper, by reaction, displaces the other friction element into engagement with said rotor.

17. The disc brake in accordance with claim 16, wherein the screw means is nonrotatably fixed to said piston, so that rotation of said other ring gear effects axial displacement of said screw means and piston.

18. The disc brake in accordance with claim 17, wherein said one friction element and piston are coupled together nonrotatably.

19. A disc brake that may be operated by motor means, comprising a caliper having a bore with a piston slidably received therein, the caliper and piston actuatable to displace a pair of friction elements into engagement with a rotor, a planetary gear assembly disposed within said bore and comprising a sun gear, planetary gears, and a pair of ring gears, and the motor means coupled with said sun gear which drives the planetary gears, one ring gear fixed to said caliper and the other ring gear rotatable by said planetary gears, the other ring gear engaging screw means which is connected with said piston, the other ring gear including an opening with internal threads which engage threads of the screw means, the screw means fixed nonrotatably to said piston so that rotation of said other ring gear effects axial displacement of said screw means and piston, the other ring gear including a pair of seals thereabout, one seal engaging an interior surface of an interior bore of said piston and the other seal engaging the bore of the caliper, operation of said motor means causing rotation of said other ring gear and operative displacement of said piston into engagement with one of said friction elements so that the caliper, by reaction, displaces the other friction element into engagement with said rotor.

20. The disc brake in accordance with claim 19, wherein the caliper comprises an integral housing with the bore being a stepped bore that receives at one end the motor means.

21. The disc brake in accordance with claim 20, wherein the stepped bore includes a radial wall having therein an opening, a drive shaft of the motor means extending through the opening.

22. A disc brake that may be operated by an electric motor, comprising a caliper having a bore with a piston slidably received therein, the caliper and piston actuatable to displace a pair of friction elements into engagement with a rotor, a planetary gear assembly disposed within said bore and comprising a sun gear, planetary gears, and a pair of ring gears, and the electric motor coupled with said sun gear which drives the planetary gears, one ring gear fixed to said caliper and the other ring gear rotatable by said planetary gears, the other ring gear having fewer teeth than the fixed ring gear so that the other ring gear rotates at a slower rate than said planetary gears rotate, the other ring gear engaging screw means which is connected with said piston, the other ring gear coupled non-rotatably with the screw means in order to effect rotation of the screw means while permitting axial misalignment therebetween, operation of said electric motor causing rotation of said other ring gear and operative displacement of said piston into engagement with one of said friction elements so that the caliper, by reaction, displaces the other friction element into engagement with said rotor, and said piston and one friction element including means for effecting a non-rotatable connection therebetween.

23. The disc brake in accordance with claim 22, wherein the screw means has splines disposed at an end thereof, the splines having spherical-shaped end surfaces which are received at tapered spline surfaces on the other ring gear in order to effect the non-rotatable connection which permits the axial misalignment.

* * * * *